(12) United States Patent
Tamburrino et al.

(10) Patent No.: US 8,422,771 B2
(45) Date of Patent: Apr. 16, 2013

(54) METHODS AND SYSTEMS FOR DEMOSAICING

(75) Inventors: Daniel Tamburrino, Nyon (CH); Jon M. Speigle, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 979 days.

(21) Appl. No.: 12/257,735

(22) Filed: Oct. 24, 2008

(65) Prior Publication Data

US 2010/0104214 A1 Apr. 29, 2010

(51) Int. Cl.
*G06K 9/00* (2006.01)
(52) U.S. Cl.
USPC .......................................... 382/162
(58) Field of Classification Search .................. None
See application file for complete search history.

(56) References Cited

U.S. PATENT DOCUMENTS

| | | | |
|---|---|---|---|
| 3,971,065 A | 7/1976 | Bayer | |
| 4,642,678 A | 2/1987 | Cok | |
| 4,779,142 A | 10/1988 | Freeman et al. | |
| 5,373,322 A | 12/1994 | Laroche et al. | |
| 5,382,976 A | 1/1995 | Hibbard | |
| 5,506,619 A | 4/1996 | Adams, Jr. et al. | |
| 5,517,255 A | 5/1996 | Gai et al. | |
| 5,596,367 A | 1/1997 | Hamilton, Jr. et al. | |
| 5,629,734 A | 5/1997 | Hamilton, Jr. et al. | |
| 5,652,621 A | 7/1997 | Adams, Jr. et al. | |
| 5,805,217 A | 9/1998 | Lu et al. | |
| 6,421,084 B1 | 7/2002 | Chang et al. | |
| 6,507,364 B1 | 1/2003 | Bishay et al. | |
| 6,912,004 B1 | 6/2005 | Knudsen et al. | |
| 6,940,061 B2 | 9/2005 | Baharav et al. | |
| 6,946,715 B2 | 9/2005 | Hong | |
| 7,053,944 B1 | 5/2006 | Acharya et al. | |
| 7,236,191 B2 | 6/2007 | Kalevo et al. | |
| 7,333,678 B1 | 2/2008 | Huang et al. | |
| 2002/0167602 A1* | 11/2002 | Nguyen | 348/280 |
| 2003/0117507 A1 | 6/2003 | Kehtarnavaz et al. | |
| 2004/0141072 A1 | 7/2004 | Nilsson et al. | |
| 2004/0218073 A1* | 11/2004 | Kalevo et al. | 348/272 |
| 2005/0030398 A1* | 2/2005 | Summa | 348/272 |
| 2005/0285968 A1* | 12/2005 | Sugimori | 348/345 |
| 2007/0035637 A1 | 2/2007 | Feng et al. | |
| 2007/0091188 A1 | 4/2007 | Chen et al. | |
| 2007/0177236 A1 | 8/2007 | Kijima et al. | |
| 2008/0088857 A1* | 4/2008 | Zimmer et al. | 358/1.6 |
| 2008/0158396 A1* | 7/2008 | Fainstain et al. | 348/246 |
| 2009/0252408 A1* | 10/2009 | Shi | 382/167 |

FOREIGN PATENT DOCUMENTS

WO WO 2008/067472 A2 6/2008

OTHER PUBLICATIONS

Alleysson, Susstrunk and Herault, "Linear Demosaicing inspired by the Human Visual System," IEEE Transactions on Image Processing, Apr. 2005, pp. 439-449, vol. 14, No. 4, IEEE, USA.

Gunturk, Glotzbach, Altunbasak, Schafer and Mersereau, "Demosaicking: Color Filter Array Interpolation," IEEE Signal Processing Magazine, Jan. 2005, pp. 44-54, vol. 22, No. 1, IEEE, USA.

(Continued)

*Primary Examiner* — Bhavesh Mehta
*Assistant Examiner* — Nirav G Patel
(74) *Attorney, Agent, or Firm* — Kristine Elizabeth Matthews; David C. Ripma

(57) ABSTRACT

Aspects of the present invention are related to systems and methods for image demosaicing.

19 Claims, 11 Drawing Sheets

OTHER PUBLICATIONS

Menon, Andriani and Calvagno, "Demosaicing With Directional Filtering and a posteriori Decision," IEEE Transactions on Image Processing, Jan. 2007, pp. 132-141, vol. 16, No. 1, IEEE, USA.

Eric Dubois, "Frequency-Domain Methods for Demosaicking of Bayer-Sampled Color Images," IEEE Signal Processing Letters, Dec. 2005, pp. 847-850, vol. 12, No. 12, IEEE, USA.

Chaix De Lavarene, Alleysson and Herault, "Practical Implementation of LMMSE Demosaicing Using Luminance and Chrominance Spaces," Computer Vision and Image Understanding, Jul. 2007, pp. 3-13, vol. 107, issue 1.

Findlater, Renshaw, Hurwitz, Henderson, Purcell, Smith and Bailey, "A CMOS Image Sensor With a Double-Junction Active Pixel," IEEE Transactions on Electron Devices, Jan. 2003, pp. 32-42, vol. 50, No. 1, IEEE, USA.

Lukac and Plataniotis, "Color Filter Arrays: Design and Performance Analysis," IEEE Transactions on Consumer Electronics, Nov. 2005, pp. 1260-1267, vol. 51, No. 4, IEEE, USA.

Li, Gunturk and Zhang, "Image Demosaicing: A Systematic Survey," Proceedings of SPIE-IS&T Electronic Imaging: Visual Communications and Image Processing 2008, 2008, pp. 68221J-1-68221J-15, SPIE vol. 6822, SPIE&IS&T.

Longere, Zhang, Delahunt and Brainard, "Perceptual Assessment of Demosaicing Algorithm Performance," Proceedings of the IEEE, Jan. 2002, pp. 123-132, vol. 90, No. 1, IEEE, USA.

Alleysson, Susstrunk and Marguier, "Influence of Spectral Sensitivity Functions on Color Demosaicing," IS&T/SID 11th Color Imaging Conference, 2003, pp. 351-357.

Lu and Tan, "Color Filter Array Demosaicking: New Method and Performance Measures," IEEE Transactions on Image Processing, Oct. 2003, pp. 1194-1210, vol. 12, No. 10, IEEE, USA.

Adams, "Design of Practical Color Filter Array Interpolation Algorithms for Digital Cameras, Part 2," Proceedings of IEEE International Conference on Image Processing, 1998, pp. 488-492, IEEE.

Hirakawa and Parks, "Adaptive Homogeneity-Directed Demosaicing Algorithm," IEEE Transactions on Image Processing, Mar. 2005, pp. 360-369, vol. 14, No. 3, IEEE, USA.

Wu and Zhang, "Primary-Consistent Soft-Decision Color Demosaicking for Digital Cameras (Patent Pending)," IEEE Transactions on Image Processing, Sep. 2004, pp. 1263-1274, vol. 13, No. 9, IEEE, USA.

Lian, Chang and Tan, "Improved Color Filter Array Demosaicking by Accurate Luminance Estimation," Proceedings of IEEE International Conference on Image Processing, 2005, pp. I-41-I-44, IEEE.

Alleysson and Chaix De Lavarene, "Frequency selection demosaicking: A review and a look ahead," Proceedings of SPIE-IS&T Electronic Imaging: Visual Communications and Image Processing 2008, 2008, pp. 68221M-1-68221M-13, SPIE vol. 6822, SPIE&IS&T.

Hirakawa and Wolfe, "Second-Generation Color Filter Array and Demosaicking Designs," Proceedings of SPIE-IS&T Electronic Imaging: Visual Communications and Image Processing 2008, 2008, pp. 68221P-1-68221P-12, SPIE vol. 6822, SPIE&IS&T.

Dubois, "Filter Design for Adaptive Frequency-Domain Bayer Demosaicking," Proceedings of IEEE International Conference on Image Processing, 2006, pp. 2705-2708, IEEE.

Zhang and Wu, "Color Demosaicking Via Directional Linear Minimum Mean Square-Error Estimation," IEEE Transactions on Image Processing, Dec. 2005, pp. 2167-2178, vol. 14, No. 12, IEEE, USA.

Gunturk, Altunbasak and Mersereau, "Color Plane Interpolation Using Alternating Projections," IEEE Transactions on Image Processing, Sep. 2002, pp. 997-1013, vol. 11, No. 9, IEEE, USA.

Menon and Calvagno, "Demosaicing Based on Wavelet Analysis of the Luminance Component," Proceedings of IEEE International Conference on Image Processing, 2007, pp. II-181-II-184, IEEE.

Kriss, "Tradeoff Between Aliasing Artifacts and Sharpness in Assessing Image Quality," Proceedings IS&T PICS Conference, 1998, pp. 247-256, IS&T.

USPTO Office Action—U.S. Appl. No. 12/256,673—Notification Date Jan. 3, 2012.

USPTO Office Action—U.S. Appl. No. 12/256,673—Notification Date May 24, 2012.

* cited by examiner

PRIOR ART

| G | R | G | R |
|---|---|---|---|
| B | G | B | G |
| G | R | G | R |
| B | G | B | G |

FIG. 1A

PRIOR ART

| G | M | G | M |
|---|---|---|---|
| Y | C | Y | C |
| G | M | G | M |
| Y | C | Y | C |

FIG. 1B

| G | R\|B | G | R\|B |
|---|---|---|---|
| R\|B | G | R\|B | G |
| G | R\|B | G | R\|B |
| R\|B | G | R\|B | G |

FIG. 2A

| G | M | G | M |
|---|---|---|---|
| M | G | M | G |
| G | M | G | M |
| M | G | M | G |

FIG. 2B

METHODS AND SYSTEMS FOR DEMOSAICING

FIELD OF THE INVENTION

Embodiments of the present invention relate generally to the field of image processing, and more specifically to spatial-domain-based methods and systems for demosaicing.

BACKGROUND

Typically, a full-color image consists of three color components per pixel. To capture three color components at each pixel, some image-acquisition systems may comprise three separate sensor arrays, each with a different spectral sensitivity, and a method for splitting and projecting the light entering the acquisition system onto each spectral sensor. Other full-color image-acquisition systems may comprise a stacked-photodiode-based sensor at each pixel, wherein three color components at a pixel may be separated by the wavelength-dependent penetration depth of the incident light within the stacked-sensor pixel. Alternatives to full-color image acquisition may comprise less-than-full-color data acquisition at each pixel and full-color reconstruction using interpolation referred to as demosaicing.

SUMMARY

Some embodiments of the present invention may comprise methods and systems for spatial-domain-based image demosaicing of mixed-pixel-type data.

In some of these embodiments, a first color component may be interpolated in a first direction and a second direction. A gradient measure in each direction may be determined, and a preferred interpolation direction may be determined based on the gradient measures. Second-color-component and third-color-component data may be interpolated using the interpolated first-color-component data in the preferred interpolation direction. In some embodiments, the second-color-component interpolation and the third-color-component interpolation may be in the preferred interpolation direction.

In alternative embodiments of the present invention, a gradient measure may be computed in a first direction and a second direction for a first color component. A preferred interpolation direction may be determined based on the gradient measures. First-color-component data may be interpolated in the preferred interpolation direction, and second-color-component and third-color-component data may be interpolated using the interpolated first-color-component data. In some embodiments, the second-color-component interpolation and the third-color-component interpolation may be in the preferred interpolation direction.

In alternative embodiments of the present invention, a first color component may be interpolated in multiple directions. A gradient measure in each direction may be determined, and a preferred interpolation direction may be determined based on the gradient measures. Second-color-component and third-color-component data may be interpolated using the interpolated first-color-component data in the preferred interpolation direction. In some embodiments, the second-color-component interpolation and the third-color-component interpolation may be in the preferred interpolation direction Some embodiments of the present invention may comprise median filtering after full-color image reconstruction.

Some embodiments of the present invention may comprise refinement of high-frequency content after full-color image reconstruction.

Some embodiments of the present invention may comprise median filtering and refinement of high-frequency content after full-color image reconstruction.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

FIG. 1A is a picture illustrating a Bayer CFA (prior art);

FIG. 1B is a picture illustrating a composite-filter CMYG CFA (prior art);

FIG. 2A is a picture illustrating an exemplary mixed-pixel-type arrangement;

FIG. 2B is a picture illustrating an exemplary mixed-pixel-type CFA;

Figure 12:
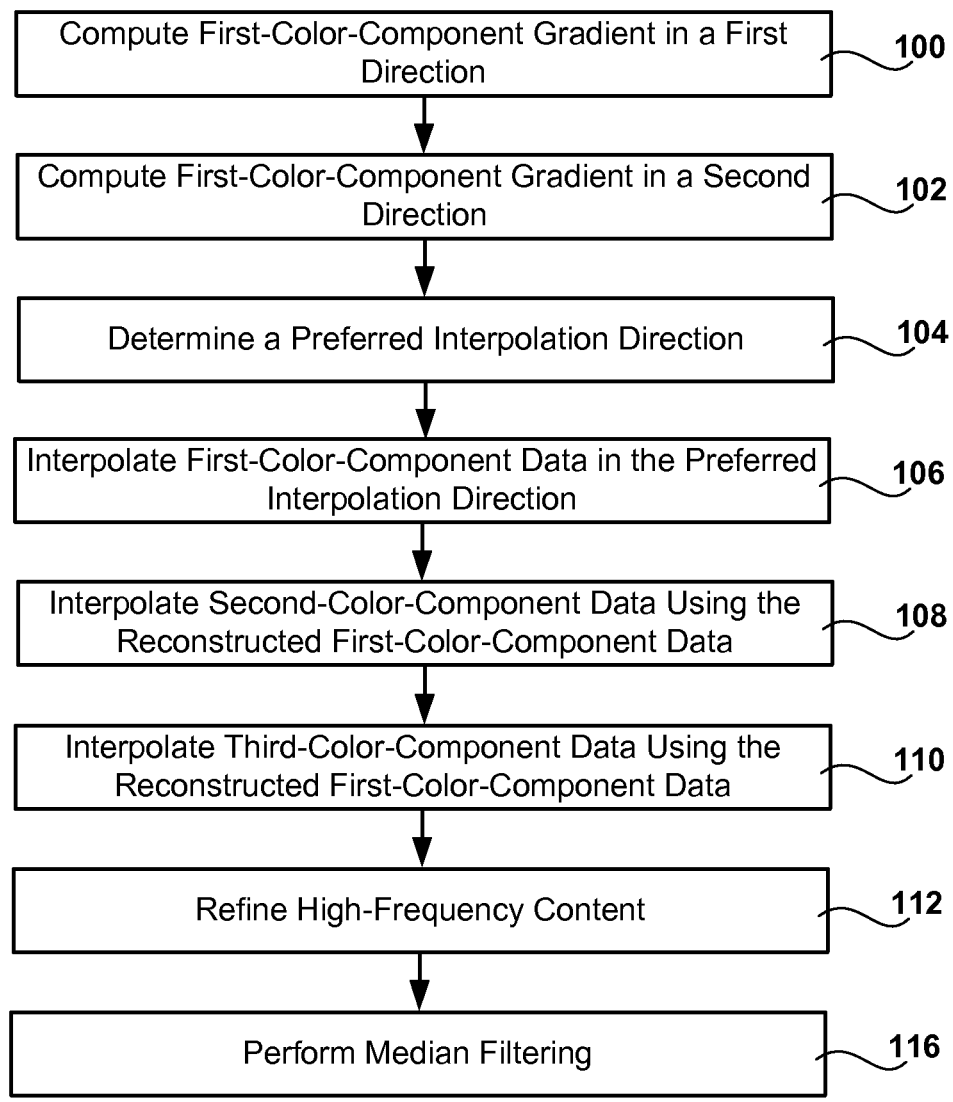
Figure 13:
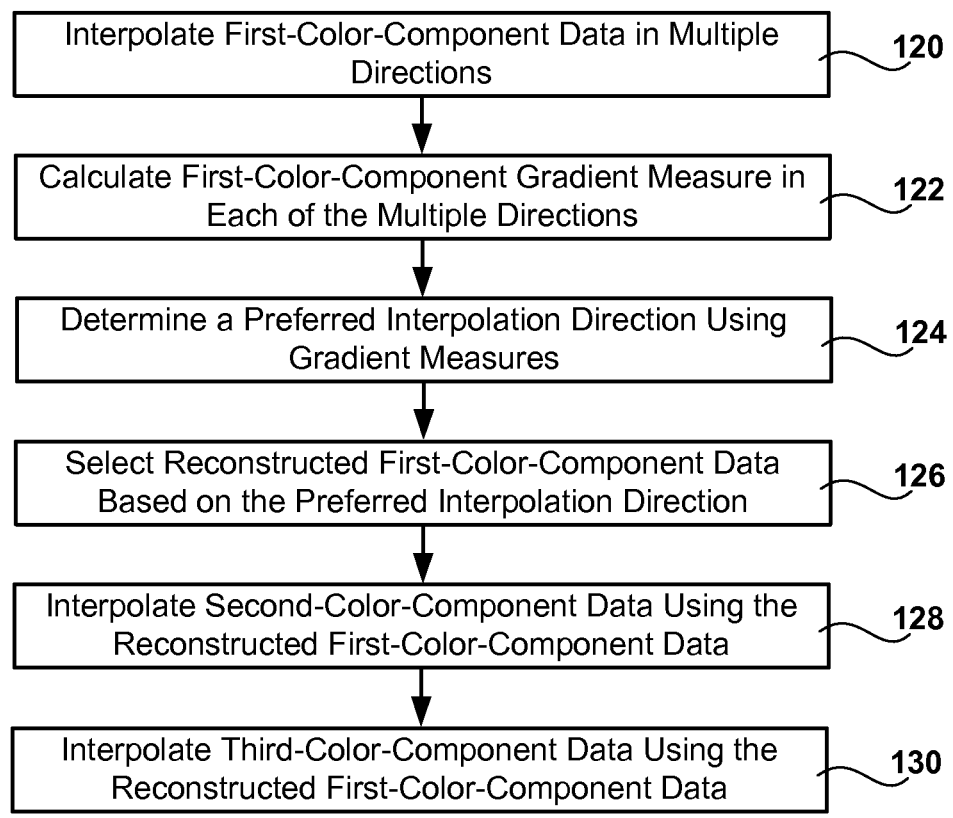

FIG. 12 is chart showing exemplary embodiments of the present invention comprising high-frequency content refinement and median filtering; and FIG. 13 is a chart showing exemplary embodiments of the present invention comprising interpolation of first-color-component data in multiple directions and determination of a preferred interpolation direction based on directional gradients in the multiple directions.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Typically, a full-color image consists of three color components per pixel. To capture three color components at each pixel, some image-acquisition systems may comprise three separate sensor arrays, each with a different spectral sensitivity, and a method for splitting and projecting the light entering the acquisition system onto each spectral sensor. Other full-color image-acquisition systems may comprise a stacked-photodiode-based sensor, wherein three color components at a pixel may be separated by the wavelength-dependent penetration depth of the incident light within the stacked-sensor pixel.

Alternatives to full-color image acquisition may comprise less-than-full-color data acquisition at each pixel and full-color reconstruction using interpolation. A standard image-acquisition system may comprise a 2-dimensional (2D) sensor array and a color filter array (CFA). The colors of a scene may be captured using the single sensor array, wherein a particular color channel may be detected at each pixel in accordance with the CFA. FIG. 1A shows the well-known Bayer CFA 10 consisting of a tiling using a 2×2 cell of two green (G) filters, one red (R) filter and one blue (B) filter on a rectangular grid. Alternative color filter arrays may comprise different spatial arrangement, filter absorption spectra, number of filters or pixel shape. FIG. 1B depicts one alternative CFA, a composite-filter CMYG (cyan-magenta-yellow-green) CFA 15. Each site in these CFAs corresponds to a single photo-sensor.

Color components which are not measured at a pixel may be interpolated using a technique which may be referred to as demosaicing (also, demosaicking). Demosaicing methods may be specific to CFA properties, which may include spatial arrangement, filter absorption spectra, number of filters, pixel shape and other CFA properties. Some demosaicing techniques may introduce artifacts and may be computationally expensive.

Alternative image-acquisition systems, wherein less-than-full-color data is captured at each pixel, may comprise sensors whereby multiple color components may be measured at some pixels and single color components may be measured at other pixels. An image-acquisition system as such may be referred to as a mixed-pixel-type image-acquisition system. Some of these image-acquisition systems may comprise stacked-photodiode-based sensors at some pixels, thereby acquiring multiple color components at these pixels, and single a photo-sensor covered by a particular color filter at other pixels, thereby acquiring a single color component at these other pixels.

An exemplary arrangement 20 of this type is depicted in FIG. 2A. Pixels labeled "G" (for example 22) may correspond to a standard pixel covered with a green filter. Pixels labeled "R|B" (for example 24) may correspond to a pixel covered with a magenta filter which passes the longer-wavelength (reddish) and shorter-wavelength (bluish) light which may be separated by the wavelength-dependent penetration depth within these stacked-sensor pixels. This arrangement may be denoted [G, R|B]. In this arrangement, full-color information is sensed at each two, horizontally or vertically neighboring, pixels: a standard pixel covered with a green filter, whereby green spectral content may be sensed; and a stacked-sensor pixel covered with a magenta filter, whereby red spectral content and blue spectral content may be sensed. FIG. 2B depicts the two-filter CFA 25 comprising standard pixels (for example 27) with a green filter and stacked two-color pixels covered with a magenta filter (for example 29). Alternative arrangements may include [R, B|G], [B, R|G], [G, G|R|B], [G, G, G, R|B], [G, R|B, R|B, G] and other arrangements comprising two different pixel types.

A sensor, wherein full color is detected with two pixels, may be referred to as a "2 Pixels Full Color" ("2PFC") sensor and the CFA may be composed of two different types of pixels and may use only two color filters. With 2PFC, and other mixed-pixel-type sensors, typically required digital processing steps may be similar to those used with a standard sensor. Exemplary digital processing which may be similar includes white balancing, tone mapping and color correction. However, standard-sensor demosaicing may not apply to mixed-pixel-type sensor. Methods and systems for demosaicing mixed-pixel-type data may be desirable.

Other alternative image-acquisition systems, wherein less-than-full-color data is captured at each pixel, may comprise sensor arrangements whereby multiple color components may be obtained at each pixel. An image-acquisition system as such may be referred to as a stacked-pixel-type image-acquisition system. Some of these image-acquisition systems may comprise tilings of stacked sensors, for example [G|R, G|B], [B|R, B|G] and other stacked-sensor tilings. Other of these image-acquisition systems may comprise two separate sensor arrays and a method for splitting and projecting the light entering the acquisition system onto each spectral sensor, whereby one of the sensor arrays may sense one color component (for example, green), and the other sensor array may be overlaid with a CFA comprising alternating filters associated with the remaining color components (for example, red and green filters). Still other of these image-acquisition systems may comprise a single sensor array used in conjunction with optical elements that allow sensing of multiple wavelength bands at each photosite. An exemplary design of this type is disclosed in U.S. Pat. No. 7,138,663, entitled "Color separation device of solid-state image sensor." As for mixed-pixel-type image-acquisition systems, standard-sensor demosaicing may not apply to stacked-pixel-type image-acquisition systems. Methods and systems for demosaicing mixed-pixel-type data and stacked-pixel-type data may be desirable.

For the purposes of describing embodiments of the present invention, image data acquired from a particular sensor arrangement may be denoted $f_{[\ ]}$, wherein the subscript, [ ], may indicate the sensor arrangement. For example, $f_{[G,R|B]}$ may indicate image data acquired from a mixed-pixel-type sensor arrangement comprising single-color-component-data green pixels and multiple-color-component-data stacked red/blue pixels. As another example, image data acquired from a stacked-pixel-type sensor arrangement [G|R, G|B] may be denoted $f_{[G|R,G|B]}$. Color-component channels or combinations of color-component channels associated with sensed data may be denoted $f_{[\ ]}^{c1}$ and $f_{[\ ]}^{c1c2}$, respectively.

Generally, demosaicing algorithms may be separated into two classes: spatial-domain-based approaches and frequency-domain-based approaches. Some embodiments of the present invention comprise methods and systems for spatial-domain-based demosaicing.

Figure 3:
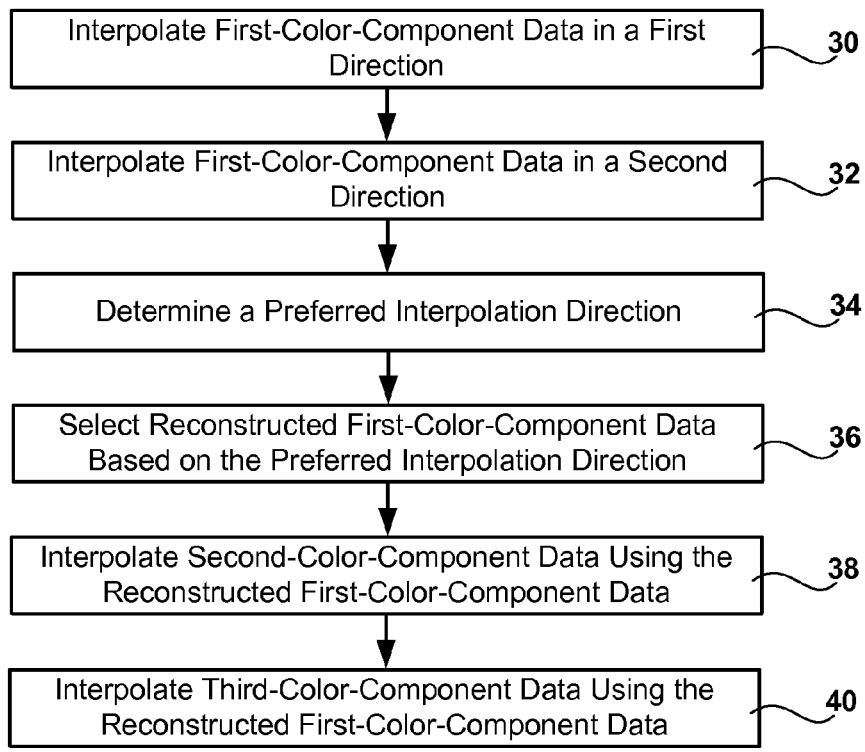
FIG. 3 is a chart showing exemplary embodiments of the present invention comprising interpolation of first-color-component data in a first direction and a second direction and determination of a preferred interpolation direction based on directional gradients.

Some embodiments of the present invention may be described in relation to FIG. 3. In these embodiments, data associated with a first color component may be interpolated 30 in a first direction. The data associated with the first color component also may be interpolated 32 in a second direction. In some embodiments, first-color-component data interpolation 30, 32 may comprise filtering of first-color-component data and data associated with a second color component according to:

$$\hat{C}_1^d = h_1^d * C_1 + h_2^d * C_2,$$

where * denotes convolution, $\hat{C}_1^d$ denotes the first-color-component interpolated data in a direction denoted d, $C_1$ and $C_2$ denote first-color-component data and second-color-component data, respectively, and $h_1^d$ and $h_2^d$ denote filter kernels associated with direction d and the first and second color components, respectively. In some exemplary embodiments of the present invention, the first color component may be associated with green spectral content and the second color component may be associated with red spectral content. In alternative exemplary embodiments of the present invention, the first color component may be associated with green spectral content and the second color component may be associated with blue spectral content. In some embodiments of the present invention, the first direction may be the horizontal direction with respect to the image coordinates, and the second direction may be the vertical direction with respect to the image coordinates. In these embodiments, the first-color-component data may be interpolated in the horizontal direction and the vertical direction according to:

$$\hat{C}_1^H = h_1^H * C_1 + h_2^H * C_2$$

and $$\hat{C}_1^V = h_1^V * C_1 + h_2^V * C_2,$$

respectively.

In alternative embodiments, the first-color-component data interpolation 30, 32 may comprise filtering of first-color-component data, second-color-component data and third-color-component data according to:

$$\hat{C}_1^d = h_1^d * C_1 + h_2^d * C_2 + h_3^d * C_3,$$

where $\hat{C}_1^d$ denotes the first-color-component interpolated data in direction d, $C_1$, $C_2$ and $C_3$ denote first-color-component data, second-color-component data and third-color-component data respectively, and $h_1^d$, $h_2^d$ and $h_3^d$ denote filter kernels associated with direction d and the first, second and third color components, respectively. In some embodiments of the present invention, in order to prevent mean color shifts, the second-color-component filter and the third-color-component filter may be jointly designed and may have zero DC response. In some embodiments of the present invention, the first color component may be associated with green spectral content, the second color component may be associated with red spectral content and the third color component may be associated with blue spectral content. In some embodiments of the present invention, the first direction may be the horizontal direction with respect to the image coordinates, and the second direction may be the vertical direction with respect to the image coordinates. In these embodiments, the first-color-component data may be interpolated in the horizontal direction and the vertical direction according to:

$$\hat{C}_1^H = h_1^H * C_1 + h_2^H * C_2 + h_3^H * C_3$$

and $$\hat{C}_1^V = h_1^V * C_1 + h_2^V * C_2 + h_3^V * C_3,$$

respectively.

A preferred interpolation direction may be determined 34, and reconstructed data associated with the first color component may be selected 36 based on the preferred direction. Second-color-component data may be interpolated 38 using the reconstructed first-color-component data, and third-color-component data may be interpolated 40 using the reconstructed first-color-component data. In some embodiments of the present invention, the first direction may be the horizontal direction with respect to image coordinates, and the second direction may be the vertical direction with respect to the image coordinates. Exemplary interpolation methods comprise bilinear interpolation, linear interpolation, spline interpolation, cubic interpolation, cosine interpolation, Hermite interpolation, polynomial interpolation and other interpolation methods known in the art.

Figure 4:
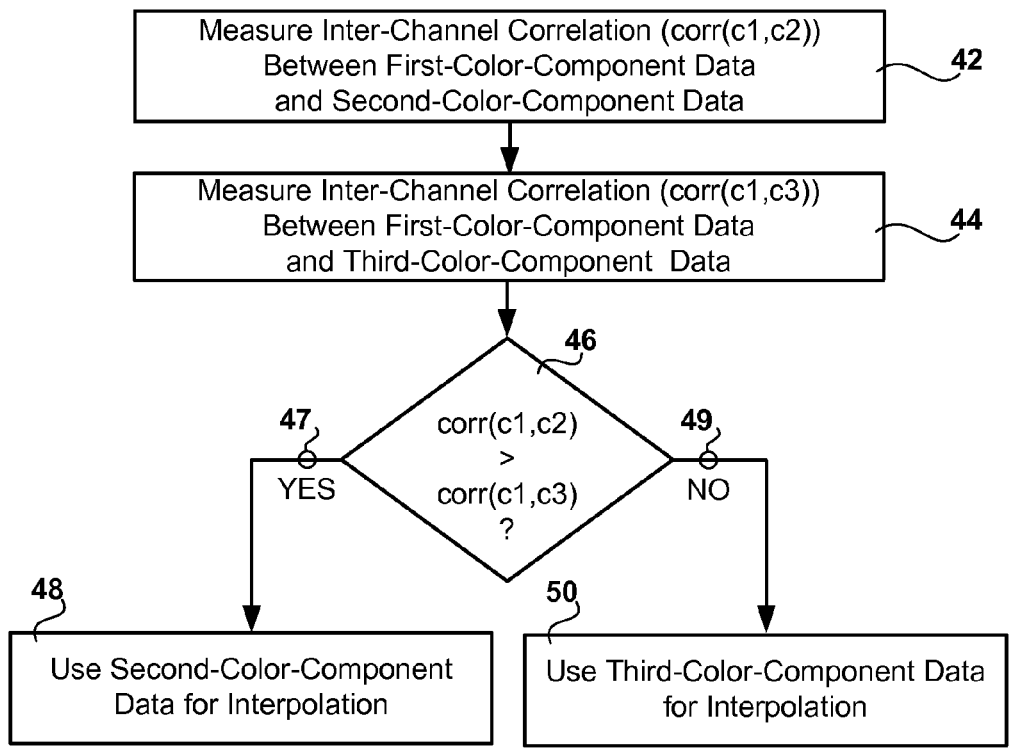
FIG. 4 is a chart showing exemplary embodiments of the present invention comprising selecting a first color channel which may be used in interpolation of a second color channel based on channel correlations.

In some embodiments of the present invention described in relation to FIG. 4, the correlation between the first-color-component data and the second-color-component data and the correlation between the first-color-component data and the third-color-component data may be used to determine which of the second-color-component data and the third-color-component data may be used in interpolation 30, 32 of the first-color-component data in the first and the second directions. In these embodiments, the inter-channel correlation between the first-color-component data and the second-color-component data, which may be denoted $r_{c1c2}$ (labeled "corr(c1,c2)" on FIG. 4), may be measured 42, and the inter-channel correlation between the first-color-component data and the third-color-component data, which may be denoted $r_{c1c3}$ (labeled "corr(c1,c3)" on FIG. 4), may be measured 44. The relationship between $r_{c1c2}$ and $r_{c1c3}$ may be examined 46, and if $r_{c1c2} > r_{c1c3}$ 47, then the second-color-component data may be used 48 to interpolate 30, 32 the first-color-component data in the two directions. If $r_{c1c2} \leq r_{c1c3}$ 49, then the third-color-component data may be used 50 to interpolate 30, 32 the first-color-component data in the two directions. In alternative embodiments of the present invention, the data associated with one of the second color component or the third color component may be predetermined as the color-component data to use to interpolate the first-color-component data.

Figure 5:
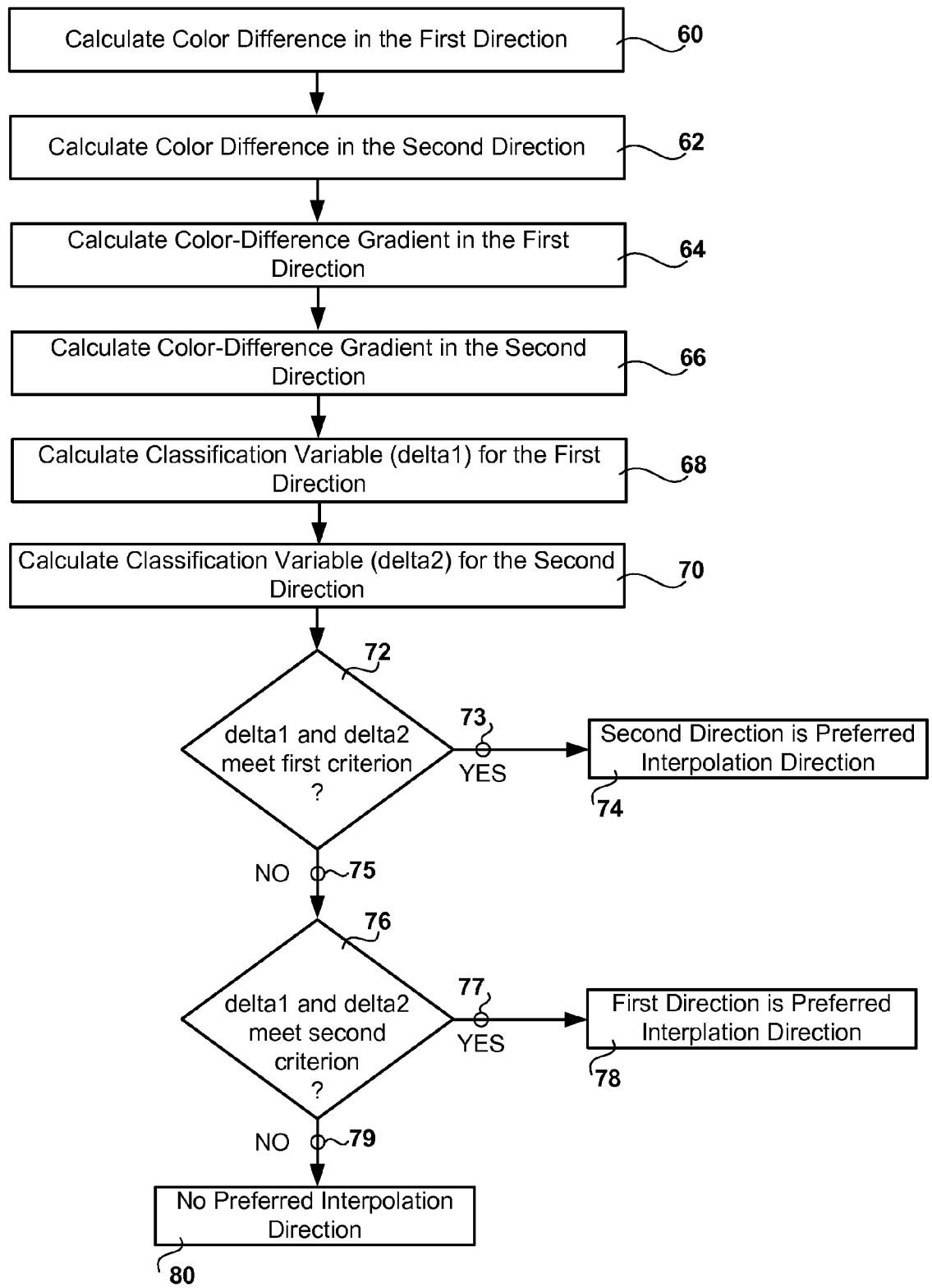
FIG. 5 is a chart showing exemplary embodiments of the present invention comprising determination of a preferred interpolation direction based on directional gradients.

A preferred interpolation direction may be determined 34, in some embodiments of the present invention, according to FIG. 5. In these embodiments, a first color difference may be calculated 60 in the first direction using the first-color-component data interpolated in the first direction and one of the second-color-component data and the third-color-component data. A second color difference may be calculated 62 in the second direction using the first-color-component data interpolated in the second direction and one of the second-color-component data and the third-color-component data. A color difference in a direction denoted d, may be determined 62, 64 according to:

$$C_{i,j}^d = C_k(i,j) - \hat{C}_1^d(i,j),$$

where $C_k(i,j)$ denotes one of the second color component and the third color component.

A gradient in the first direction may be calculated 64, and a gradient in the second direction may be calculated 66 using the respective color differences. In some embodiments of the present invention, a gradient in a direction d, may be determined 64, 66 according to:

$$D_{i,j}^d = |C_{i,j}^d - C_{d(i,j)}^d|,$$

where d(i,j) denotes a directional displacement relative to i,j. In some embodiments of the present invention, the first direction may be the horizontal direction with respect to image coordinates, and the second direction may be the vertical direction with respect to the image coordinates. In these embodiments, a horizontal gradient and a vertical gradient may be determined according to:

$$D_{i,j}^H = |C_{i,j}^H - C_{dH(i,j)}^H|$$

and $$D_{i,j}^V = |C_{i,j}^V - C_{dV(i,j)}^V|.$$

In some embodiments, the horizontal displacement may be such that: $D_{i,j}^H = |C_{i,j}^H - C_{i,j+2}^H|$, and the vertical displacement may be such that: $D_{i,j}^V = |C_{i,j}^V - C_{i+2,j}^V|$. In alternative embodiments, a directional gradient may be calculated 64, 66 over larger windows according to:

$$D_{i,j}^d = \sum_{J=-K1}^{K1} \sum_{I=-K2}^{K2} g_{I,J}^d C_{i+I,j+J}^d$$

for a direction d, and $$D_{i,j}^H = \sum_{J=-K1}^{K1} \sum_{I=-K2}^{K2} g_{I,J}^H C_{i+I,j+J}^H$$

and $$D_{i,j}^V = \sum_{J=-K1}^{K1} \sum_{I=-K2}^{K2} g_{I,J}^V C_{i+I,j+J}^V,$$

for the horizontal direction and vertical direction, respectively. The weights $g_{I,J}^d$, $g_{I,J}^H$ and $g_{I,J}^V$ may determine which neighboring pixels may contribute to the directional gradient and with what weight they may contribute. In yet alternative embodiments, a directional gradient may be based on three-channel data within a window according to:

$$D_{i,j}^d = \sum_{J=-K1}^{K1} \sum_{I=-K2}^{K2} g_2^d(I,J) C_2(i+I, j+J) + $$

$$g_1^d(I,J) \hat{C}_1^d(i+I, j+J) + g_3^d(,J) C_3(i+I, j+J)$$

where $g_1^d$, $g_2^d$ and $g_3^d$ may determine which neighboring pixels, for each color component, contribute to the gradient and with what weight they may contribute. Where there is no color-component data available, the corresponding weights may be zero.

A first-direction classification variable may be calculated 68 in the first direction, and a second-direction classification variable may be calculated 70 in the second direction. In some embodiments, for a particular direction, a classification variable value at a location may be the weighted sum of the directional-gradient values in a neighborhood proximate to the location.

The first-direction classification variable and the second-direction classification variable may be examined 72, and when the first-direction classification variable and the second-direction classification variable meet 73 a first criterion, the first direction may be the preferred interpolation direction 74 at the location. When the first-direction classification variable and the second-direction classification variable do not meet 75 the first criterion, then the first-direction classification variable and the second-direction classification variable may be examined 76, and when the first-direction classification variable and the second-direction classification variable meet 77 a second criterion, the second direction may be the preferred interpolation direction 78 at the location. When the classification variables do not meet the first criterion and the second criterion 79, then there may be no preferred interpolation direction 80.

Exemplary embodiments of the present invention described in relation to FIG. 3, FIG. 4 and FIG. 5 may be illustrated for mixed-pixel-type data sensed in accordance with a [G, R|B] sensor arrangement. At alternating pixels, green data or red and blue data is available for this sensor arrangement. In some exemplary embodiments of the present invention, the red data channel may be used to interpolate 30, 32 the missing green channel values in the horizontal direction and the vertical direction according to the two 5-tap FIR filters, respectively:

$$\hat{G}_{i,j}^H = \frac{1}{2}(G_{1,j+1} + G_{i,j-1}) + \frac{1}{4}(2R_{i,j} - R_{i,j+2} - R_{i,j-2})$$

and $$\hat{G}_{i,j}^V = \frac{1}{2}(G_{1+1,j} + G_{i-1,j}) + \frac{1}{4}(2R_{i,j} - R_{i+2,j} - R_{i-2,j})$$

where $G_{m,n}$ and $R_{m,n}$ denote sensed green-channel and red-channel values at a location m,n, respectively, and $\hat{G}_{i,j}^V$ and $\hat{G}_{i,j}^H$ are the vertically interpolated and horizontally interpolated green-channel values, respectively, at location i,j. In alternative exemplary embodiments of the present invention, the blue data channel may be used to interpolate 30, 32 the missing green channel values in the horizontal direction and the vertical direction according to the two 5-tap FIR filters, respectively:

$$\hat{G}_{i,j}^H = \frac{1}{2}(G_{1,j+1} + G_{i,j-1}) + \frac{1}{4}(2B_{i,j} - B_{i,j+2} - B_{i,j-2})$$

and $$\hat{G}_{i,j}^V = \frac{1}{2}(G_{1+1,j} + G_{i-1,j}) + \frac{1}{4}(2B_{i,j} - B_{i+2,j} - B_{i-2,j})$$

where $B_{m,n}$ denote sensed blue-channel values at a location m,n. Alternative interpolation filters may be used.

In some of these exemplary embodiments, a preferred interpolation direction may be determined 34 by calculating 60, 62 the horizontal and vertical color differences according to:

$$C_{i,j}^H = R_{i,j} - \hat{G}_{i,j}^H$$

and $$C_{i,j}^V = R_{i,j} - \hat{G}_{i,j}^V,$$

respectively, at pixel locations i,j corresponding to pixels wherein red data may be sensed and green data interpolated. In alternative of these exemplary embodiments, a preferred interpolation direction may be determined 34 by calculating 60, 62 the horizontal and vertical color differences according to:

$$C_{i,j}^H = B_{i,j} - \hat{G}_{i,j}^H$$

and $$C_{i,j}^V = B_{i,j} - \hat{G}_{i,j}^V,$$

respectively.

In some embodiments of the present invention, horizontal and vertical color-difference gradients may be calculated 64, 66 according to:

$$D_{i,j}^H = |C_{i,j}^H - C_{i,j+2}^H|$$

and $$D_{i,j}^V = |C_{i,j}^V - C_{i+2,j}^V|,$$

respectively. Alternative embodiments of the present invention may comprise alternative directional gradient operators.

In some embodiments of the present invention, horizontal and vertical classification variables may be evaluated 68, 70 according to:

$$\delta_{i,j}^H = D_{i-2,j-2}^H + D_{i-2,j}^H + D_{i-1,j-1}^H + \alpha D_{i,j-2}^H + \alpha D_{i,j}^H + D_{i+1,j-1}^H + D_{i+2,j-2}^H + D_{i+2,j}^H$$

and $$\delta_{i,j}^V = D_{i,j-2}^V + \alpha D_{i-2,j}^V + D_{i-2,j+2}^V + D_{i-1,j-1}^V + \dots ,$$

respectively, where in some embodiments of the present invention, the weight $\alpha = 3$.

In some embodiments of the present invention, the preferred interpolation direction may be determined 34 based on the classification variables. In these embodiments, if the horizontal classification variable is larger than the vertical classification variable, then a vertical edge may be proximate to pixel i,j, and the preferred interpolation direction for interpolating the green channel at i,j may be the vertical direction. If the vertical classification variable is larger than the horizontal classification variable, then a horizontal edge may be proximate to pixel i,j, and the preferred interpolation direction for interpolating the green channel at i,j may be the horizontal direction. If the classification variables are substantially equal, then there may be no preferred interpolation direction, and the green channel value at i,j may be a combination of the horizontally interpolated value and the vertically interpolated value. In some embodiments of the present invention, the reconstructed green channel data may be selected 36 according to:

$$\hat{G}_{i,j} = \hat{G}_{i,j}^H \quad \delta_{i,j}^H < \delta_{i,j}^V$$

$$\hat{G}_{i,j} = \hat{G}_{i,j}^V \quad \delta_{i,j}^H > \delta_{i,j}^V$$

$$\hat{G}_{i,j} = \frac{1}{2}(\hat{G}_{i,j}^H + \hat{G}_{i,j}^V) \quad \delta_{i,j}^H = \delta_{i,j}^V,$$

where $\hat{G}_{i,j}$ be the reconstructed green pixel at location i,j. In alternative embodiments, the green channel data may be selected 36 according to:

$$\hat{G}_{i,j} = \hat{G}_{i,j}^H \quad \delta_{i,j}^V - \delta_{i,j}^H > \beta$$

$$\hat{G}_{i,j} = \hat{G}_{i,j}^V \quad \delta_{i,j}^H - \delta_{i,j}^V > \beta$$

$$\hat{G}_{i,j} = \frac{1}{2}(\hat{G}_{i,j}^H + \hat{G}_{i,j}^V) \quad |\delta_{i,j}^H - \delta_{i,j}^V| \leq \beta,$$

where the threshold $\beta$ may account for smooth regions in the image.

In some embodiments, the red and blue channels may be interpolated 38, 40 using bilinear interpolation of color differences according to:

$$\hat{R}_{i,j} = G_{i,j} + \frac{1}{4}(R_{i,j-1} - \hat{G}_{i,j-1} + R_{i,j+1} - \hat{G}_{i,j+1} + R_{i-1,j} - \hat{G}_{i-1,j} + R_{i+1,j} - \hat{G}_{i+1,j})$$

and $$\hat{B}_{i,j} = G_{i,j} + \frac{1}{4}(B_{i,j-1} - \hat{G}_{i,j-1} + B_{i,j+1} - \hat{G}_{i,j+1} + B_{i-1,j} - \hat{G}_{i-1,j} + B_{i+1,j} - \hat{G}_{i+1,j}),$$

respectively, where $\hat{R}_{i,j}$ is the reconstructed red pixel at location i,j and $\hat{B}_{i,j}$ is the reconstructed blue pixel at location i,j.

In alternative embodiments, the red and blue channels may be interpolated 38, 40 in a direction associated with the preferred interpolation direction. Since the horizontal and vertical classification variables are defined at i,j locations wherein a green pixel may require interpolation, associated horizontal and vertical classification variables may be defined at pixel locations wherein interpolation of the red channel and the blue channel may be required. In some embodiments of the present invention, the horizontal classification variable and the vertical classification variable at pixel i,j, wherein location i,j may be associated with red and blue interpolation sites, may be determined according to:

$$\hat{\delta}_{i,j}^H = \frac{1}{4}(\delta_{i,j-1}^H + \delta_{i,j+1}^H + \delta_{i-1,j}^H + \delta_{i+1,j}^H)$$

and $$\hat{\delta}_{i,j}^V = \frac{1}{4}(\delta_{i,j-1}^V + \delta_{i,j+1}^V + \delta_{i-1,j}^V + \delta_{i+1,j}^V),$$

respectively. In alternative embodiments, the horizontal classification variable and the vertical classification variable at pixel i,j, wherein location i,j may be associated with red and blue interpolation sites, may be determined according to:

$$\delta_{i,j}^H = \max(\delta_{i,j-1}^H, \delta_{i,j+1}^H, \delta_{i-1,j}^H, \delta_{i+1,j}^H)$$

and $$\delta_{i,j}^V = \max(\delta_{i,j-1}^V, \delta_{i,j+1}^V, \delta_{i-1,j}^V, \delta_{i+1,j}^V),$$

respectively.

In some embodiments, red and blue channel interpolation 38, 40 may be performed according to:

$$\hat{R}_{i,j} = G_{i,j} + \frac{1}{2}(R_{i,j-1} - \hat{G}_{i,j-1} + R_{i,j+1} - \hat{G}_{i,j+1}) \qquad \delta_{i,j}^H < \delta_{i,j}^V$$

$$\hat{R}_{i,j} = G_{i,j} + \frac{1}{2}(R_{i-1,j} - \hat{G}_{i-1,j} + R_{i+1,j} - \hat{G}_{i+1,j}) \qquad \delta_{i,j}^H > \delta_{i,j}^V$$

$$\hat{R}_{i,j} = G_{i,j} + \frac{1}{4}(R_{i,j-1} - \hat{G}_{i,j-1} + R_{i,j+1} - \hat{G}_{i,j+1} + R_{i-1,j} - \hat{G}_{i-1,j} + R_{i+1,j} - \hat{G}_{i+1,j}), \qquad \delta_{i,j}^H = \delta_{i,j}^V$$

and $$\hat{B}_{i,j} = G_{i,j} + \frac{1}{2}(B_{i,j-1} - \hat{G}_{i,j-1} + B_{i,j+1} - \hat{G}_{i,j+1}) \qquad \delta_{i,j}^H < \delta_{i,j}^V$$

$$\hat{B}_{i,j} = G_{i,j} + \frac{1}{2}(B_{i-1,j} - \hat{G}_{i-1,j} + B_{i+1,j} - \hat{G}_{i+1,j}) \qquad \delta_{i,j}^H > \delta_{i,j}^V$$

$$\hat{B}_{i,j} = G_{i,j} + \frac{1}{4}(B_{i,j-1} - \hat{G}_{i,j-1} + B_{i,j+1} - \hat{G}_{i,j+1} + B_{i-1,j} - \hat{G}_{i-1,j} + B_{i+1,j} - \hat{G}_{i+1,j}), \qquad \delta_{i,j}^H = \delta_{i,j}^V,$$

respectively. In alternative embodiments, red and blue channel interpolation 38, 40 may be performed according to:

$$\hat{R}_{i,j} = G_{i,j} + \frac{1}{2}(R_{i,j-1} - \hat{G}_{i,j-1} + R_{i,j+1} - \hat{G}_{i,j+1}) \qquad \delta_{i,j}^V - \delta_{i,j}^H > \beta$$

$$\hat{R}_{i,j} = G_{i,j} + \frac{1}{2}(R_{i-1,j} - \hat{G}_{i-1,j} + R_{i+1,j} - \hat{G}_{i+1,j}) \qquad \delta_{i,j}^H - \delta_{i,j}^V > \beta$$

$$\hat{R}_{i,j} = G_{i,j} + \frac{1}{4}(R_{i,j-1} - \hat{G}_{i,j-1} + R_{i,j+1} - \hat{G}_{i,j+1} + R_{i-1,j} - \hat{G}_{i-1,j} + R_{i+1,j} - \hat{G}_{i+1,j}), \qquad |\delta_{i,j}^H - \delta_{i,j}^V| \le \beta$$

and $$\hat{B}_{i,j} = G_{i,j} + \frac{1}{2}(B_{i,j-1} - \hat{G}_{i,j-1} + B_{i,j+1} - \hat{G}_{i,j+1}) \qquad \delta_{i,j}^V - \delta_{i,j}^H > \beta$$

$$\hat{B}_{i,j} = G_{i,j} + \frac{1}{2}(B_{i-1,j} - \hat{G}_{i-1,j} + B_{i+1,j} - \hat{G}_{i+1,j}) \qquad \delta_{i,j}^H - \delta_{i,j}^V > \beta$$

$$\hat{B}_{i,j} = G_{i,j} + \frac{1}{4}(B_{i,j-1} - \hat{G}_{i,j-1} + B_{i,j+1} - \hat{G}_{i,j+1} + B_{i-1,j} - \hat{G}_{i-1,j} + B_{i+1,j} - \hat{G}_{i+1,j}), \qquad |\delta_{i,j}^H - \delta_{i,j}^V| \le \beta$$

respectively, where the threshold β may account for smooth regions in the image.

Figure 6:
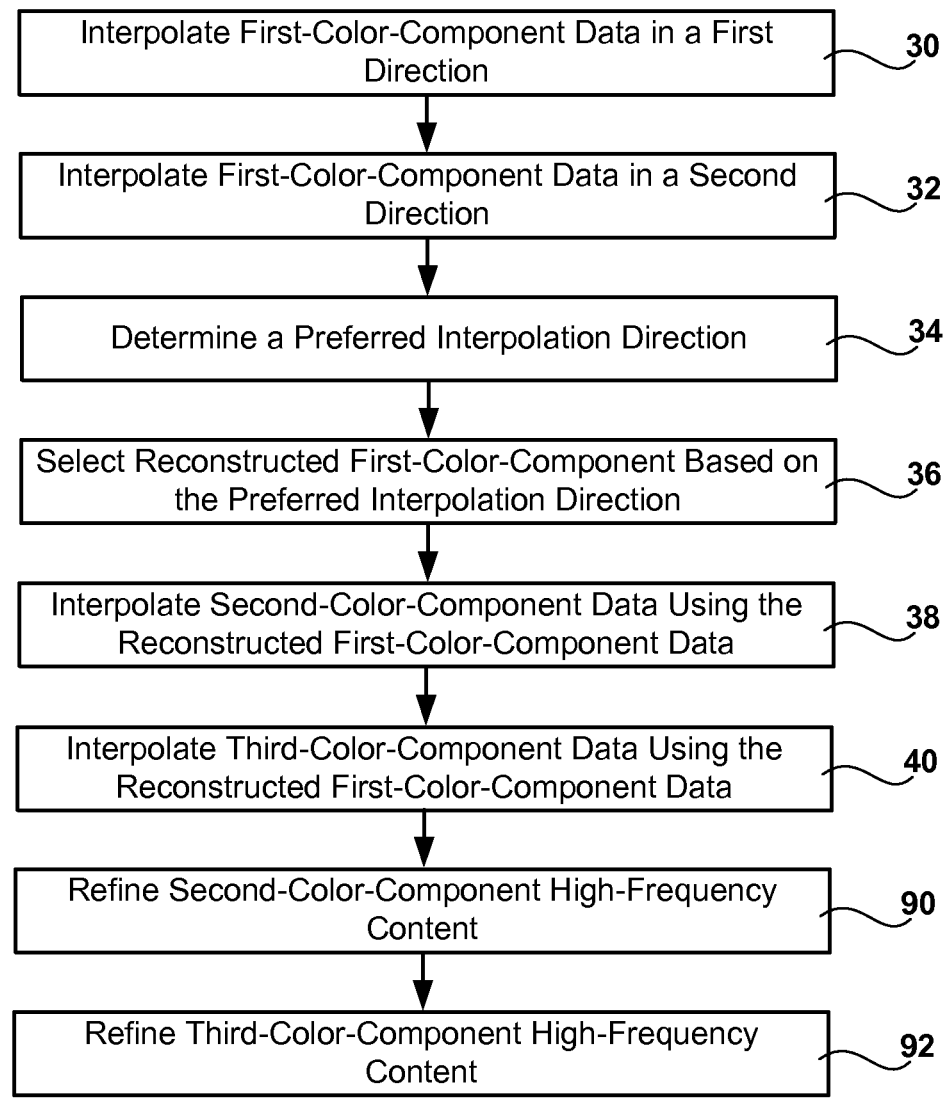
FIG. 6 is a chart showing exemplary embodiments of the present invention comprising high-frequency content refinement of interpolated color channels.

Some embodiments of the present invention described in relation to FIG. 6 may comprise refinement of high-frequency content. High-frequency-content refinement may eliminate reconstruction artifacts in high-frequency regions. In these embodiments, a color-component value may be decomposed into high-frequency and low-frequency components according to:

$$C_{i,j} = C_{i,j}^{low} + C_{i,j}^{high}$$

where C denotes the value at i,j associated with a color component. The high-frequency component of the reconstructed second-color-component values may be refined 90 according to:

$$C2_{i,j} = C2_{i,j}^{low} + C1_{i,j}^{high},$$

and the high-frequency component of the reconstructed third-color-component values may be refined 92 according to:

$$C3_{i,j} = C3_{i,j}^{low} + C1_{i,j}^{high}.$$

In some embodiments of the present invention, an FIR low-pass filter, for example $$\frac{1}{3}[111],$$

may be used to extract low-frequency content. High-frequency content may determined by subtracting the low-frequency content from the component value. In some embodiments of the present invention, the low-pass filter may be applied in the preferred interpolation direction to avoid creating artifacts along edges in the image.

In some embodiments of the present invention, the reconstructed red and blue channels may be refined 90, 92 according to:

$$R_{i,j} = R_{i,j}^{low} + G_{i,j}^{high}$$

and $$B_{i,j} = B_{i,j}^{low} + G_{i,j}^{high},$$

respectively, where $R_{i,j}^{low}$ and $B_{i,j}^{low}$ denote the low-frequency content of the reconstructed red and blue channel data, respectively, and $G_{i,j}^{high}$ denotes the high-frequency content of the reconstructed green channel.

Figure 7:
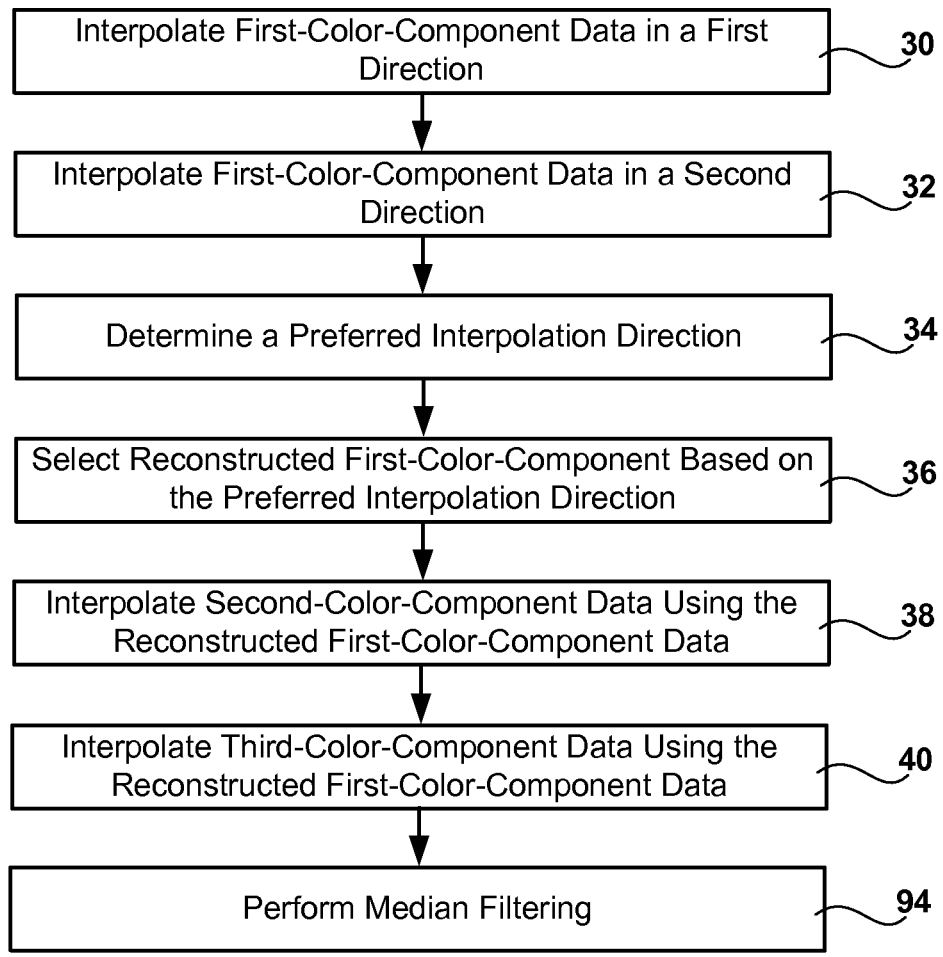
FIG. 7 is a chart showing exemplary embodiments of the present invention comprising median filtering of reconstructed full-color data.

In some embodiments of the present invention described in relation to FIG. 7, a reconstructed full-color image may be median filtered 94 after demosaicing. Color differences may vary slowly, and small variations in color may be suppressed by median filtering. Accordingly, in some of these embodiments, median filtering 94 may be performed on color differences. In some embodiments of the present invention, median filtering 94 may comprise a 3×3 kernel. In some embodiments of the present invention, the median filter 94 may be applied only to the reconstructed pixels. In alternative embodiments, the median filter 94 may be applied to all pixels. In some embodiments of the present invention, the R channel may be computed first, followed by the B channel and finally the G channel. The three channels may be computed according to:

$$R = G + \text{median } (R - G),$$

$$B = G + \text{median } (B - G)$$

and $$G = \frac{1}{2}[R + \text{median } (R - G) + B + \text{median } (B - G)].$$

In some embodiments of the present invention, the median filtering 92 may be applied once. In alternative embodiments of the present invention, the median filtering 92 may be sequentially applied multiple times.

Figure 8:
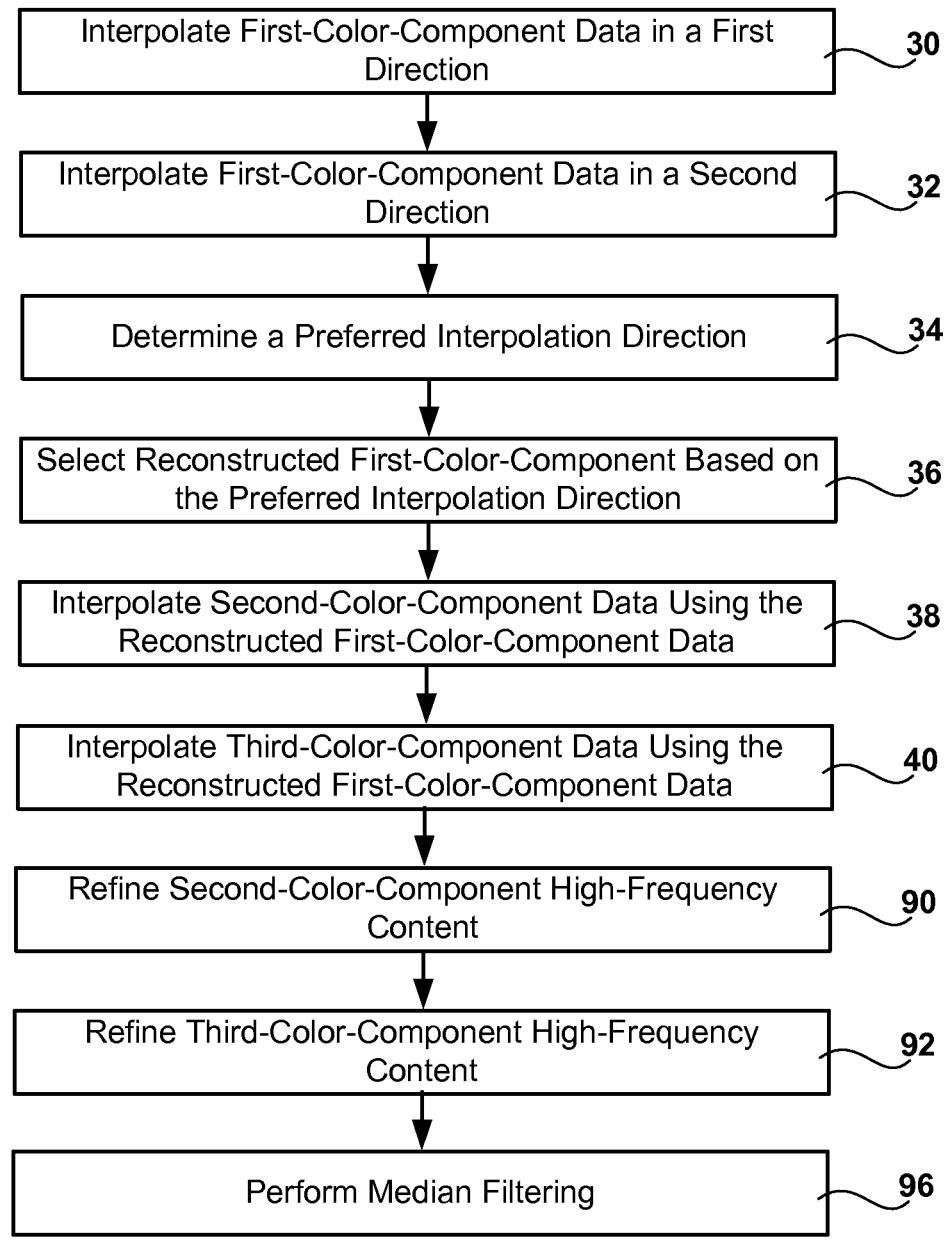
FIG. 8 is a chart showing exemplary embodiments of the present invention comprising high-frequency content refinement and median filtering.

Some embodiments of the present invention described in relation to FIG. 8 may comprise full-color image reconstruction followed by refinement 90, 92 of high-frequency content and median filtering 96.

Figure 9:
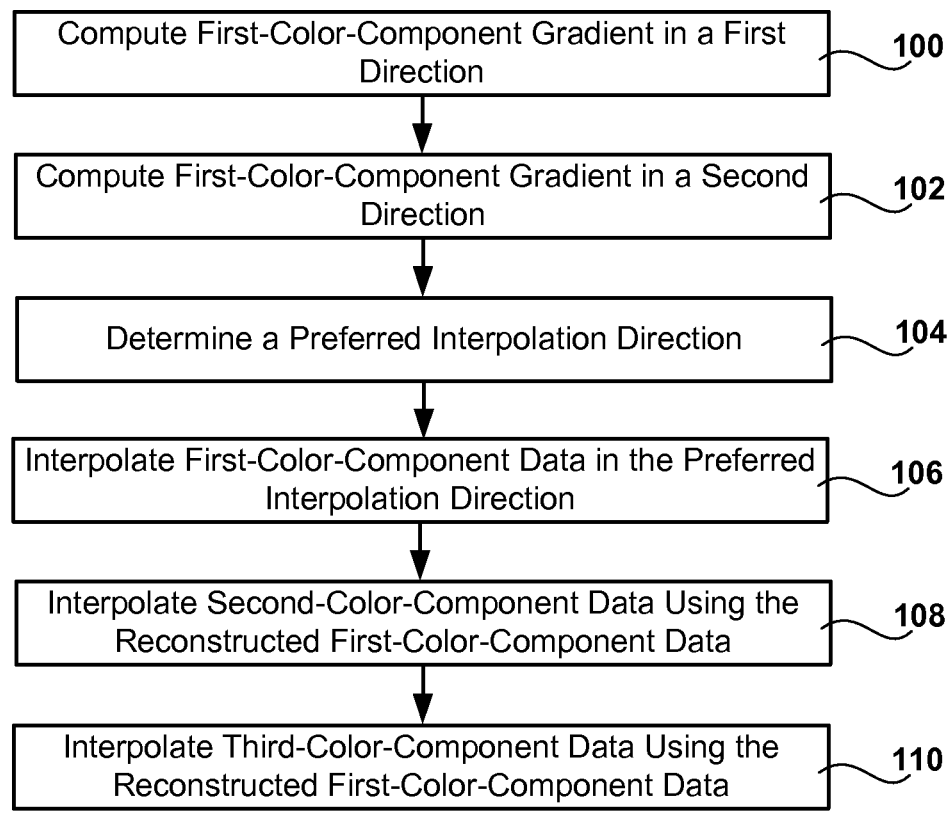
FIG. 9 is a chart showing exemplary embodiments of the present invention comprising determination of a preferred interpolation direction based on computed first-color-channel gradients.

Alternative embodiments of the present invention may be described in relation to FIG. 9. In these embodiments, a gradient in a first direction may be computed 100 for missing pixel locations associated with a first color component. A gradient in a second direction may be computed 102 for the missing pixel locations associated with the first color component. Generally, a directional gradient at a pixel i,j, in a direction denoted d, may be based on three-channel data within a window containing the pixel according to:

$$D_{i,j}^d = \sum_{J=-K1}^{K1} \sum_{I=-K2}^{K2} g_2^d(I, J) C_2(i+I, j+J) + g_1^d(I, J)\hat{C}_1^d(i+I, j+J) g_3^d(I, J) C_3(i+I, j+J)$$

where $g_1^d$, $g_2^d$ and $g_3^d$ may determine which neighboring pixels, for each color component, contribute to the gradient and with what weight they may contribute. Where there is no color-component data available, the corresponding weights may be zero.

A preferred interpolation direction may be determined 104 based on the directional gradient values. In some embodiments of the present invention, the preferred interpolation direction may be determined based on the value of the difference of the gradient values in the first direction and the gradient values in the second direction. Letting $\delta_{i,j} = D_{i,j}^{d1} - D_{i,j}^{d2}$ and $T_\delta$ be a pre-determined threshold value, then in some embodiments of the present invention, the preferred interpolation direction may be the first direction when $\delta_{i,j} < -T_\delta$ indicating an edge in the first direction, and the preferred interpolation direction maybe the second direction when $\delta_{i,j} > T_\delta$ indicating an edge in the second direction. When $|\delta_{i,j}| \leq T_\delta$ there may be no preferred interpolation direction. In alternative embodiments of the present invention, the preferred interpolation direction may be determined according to:

$$\delta_{i,j} = \arctan\left(\frac{D_{i,j}^{d1}}{D_{i,j}^{d2}}\right),$$

where d1 and d2 may denote two orthogonal directions in which the gradients may be measured. In some embodiments of the present invention, the preferred interpolation direction may be the first direction d1 when $\delta_{i,j}$ is close to zero, and may be the second direction d2 when $\delta_{i,j}$ is close to $$\frac{\pi}{2}.$$

In alternative embodiments, the preferred interpolation direction may be orthogonal to $\delta_{i,j}$.

Missing first-color-component data may be interpolated 106 in the preferred interpolation direction. The fully reconstructed first-color-component data may be used to interpolate 108 the second-color-component data and to interpolate 110 the third-color-component data. In some embodiments of the present invention, the second-color-component interpolation 108 may be in the preferred interpolation direction, and the third-color-component interpolation 110 may be in the preferred interpolation direction.

Exemplary embodiments of the present invention described in relation to FIG. 9 may be illustrated for mixed-pixel-type data sensed in accordance with a [G, R|B] sensor arrangement. At alternating pixels, green data or red and blue data is available for this sensor arrangement. In some exemplary embodiments of the present invention, green-channel gradients at missing green pixel locations may be computed in the horizontal direction 100 and the vertical direction 102 according to:

$$\Delta H_{ij} = \frac{1}{2} R_{i,j-2} - R_{i,j} + \frac{1}{2} R_{i,j+2}$$

and $$\Delta V_{ij} = \frac{1}{2} R_{i-2,j} - R_{i,j} + \frac{1}{2} R_{i-2,j},$$

respectively. In alternative embodiments, the green-channel gradients at missing green pixel locations may be computed in the horizontal direction 100 and the vertical direction 102 according to:

$$\Delta H_{i,j} = \frac{1}{2} B_{i,j-2} - B_{i,j} + \frac{1}{2} B_{i,j+2}$$

and $$\Delta V_{i,j} = \frac{1}{2} B_{i-2,j} - B_{i,j} + \frac{1}{2} B_{i-2,j},$$

respectively. In some embodiments of the present invention, the channel with the highest correlation with the green channel may be used in the interpolation 100, 102. In some embodiments a weighted combination of neighboring values may be used to estimate the horizontal and vertical gradients:

$$\Delta H_{i,j} = w_i * \left(\frac{1}{2} B_{i,j-2} - B_{i,j} + \frac{1}{2} B_{i,j+2}\right) + w_2 * \left(\frac{1}{2} R_{i,j-2} - R_{i,j} + \frac{1}{2} R_{i,j+2}\right)$$

and $$\Delta V_{i,j} = w_i * \left(\frac{1}{2} B_{i-2,j} - B_{i,j} + \frac{1}{2} B_{i+2,j}\right) + w_2 * \left(\frac{1}{2} R_{i-2,j} - R_{i,j} + \frac{1}{2} R_{i+2,j}\right).$$

The gradient information may be used to select an interpolation kernel which may be adaptive to local edge information. In some embodiments of the present invention, the preferred interpolation direction may be determined 104 in relation to a threshold $T_\delta$. Defining $\delta_{i,j}=\Delta H_{i,j}-\Delta V_{i,j}$, then when $\delta_{i,j}>T_\delta$, the preferred interpolation direction may be the vertical direction. When $\delta_{i,j}<-T_\delta$, then the preferred interpolation direction may be the horizontal direction, and when $|\delta_{i,j}|\leq T_\delta$, then there may be no preferred interpolation direction. The green channel may be interpolated 106, in some embodiments of the present invention, using bilinear interpolation in the preferred interpolation direction according to:

$$\hat{G}_{i,j} = \frac{1}{2}(G_{i-1,j} + G_{i+1,j}) \qquad \delta_{i,j} > T_\delta$$

$$\hat{G}_{i,j} = \frac{1}{2}(G_{i,j-1} + G_{i,j+1}) \qquad \delta_{i,j} < -T$$

$$\hat{G}_{i,j} = \frac{1}{4}(G_{i-1,j} + G_{i+1,j} + G_{i,j-1} + G_{i,j+1}) \quad |\delta_{i,j}| \leq T,$$

In alternative embodiments, a different interpolation method may be used in the preferred interpolation direction. Exemplary interpolation methods comprise bilinear interpolation, linear interpolation, spline interpolation, cubic interpolation, cosine interpolation, Hermite interpolation, polynomial interpolation and other interpolation methods known in the art.

In alternative embodiments of the present invention, the preferred interpolation direction may be determined 104 in relation to $$\delta_{i,j} = \arctan\left(\frac{\Delta V_{i,j}}{\Delta H_{i,j}}\right),$$

wherein the preferred interpolation direction may be orthogonal to $$\delta_{i,j} = \arctan\left(\frac{\Delta V_{i,j}}{\Delta H_{i,j}}\right).$$

In these embodiments, the green channel may be interpolated 106 in the preferred interpolation direction.

The red and green channel data may be interpolated 108, 110 using color differences. Letting $C_{i,j}^{GR}=\hat{G}_{i,j}-R_{i,j}$ and $C_{i,j}^{GB}=\hat{G}_{i,j}-B_{i,j}$ be the red and blue color differences, respectively, at known red and blue pixels, respectively, the reconstructed red and blue channels may be determined according to:

$$\hat{R}_{i,j} = G_{i,j} - \frac{1}{4}(C_{i-1,j}^{GR} + C_{i+1,j}^{GR} + C_{i,j-1}^{GR} + C_{i,j+1}^{GR})$$

and $$\hat{B}_{i,j} = G_{i,j} - \frac{1}{4}(C_{i-1,j}^{GB} + C_{i+1,j}^{GB} + C_{i,j-1}^{GB} + C_{i,j+1}^{GB}),$$

respectively. In alternative embodiments of the present invention, the red and blue channels may be interpolated in the preferred interpolation direction.

Figure 10:
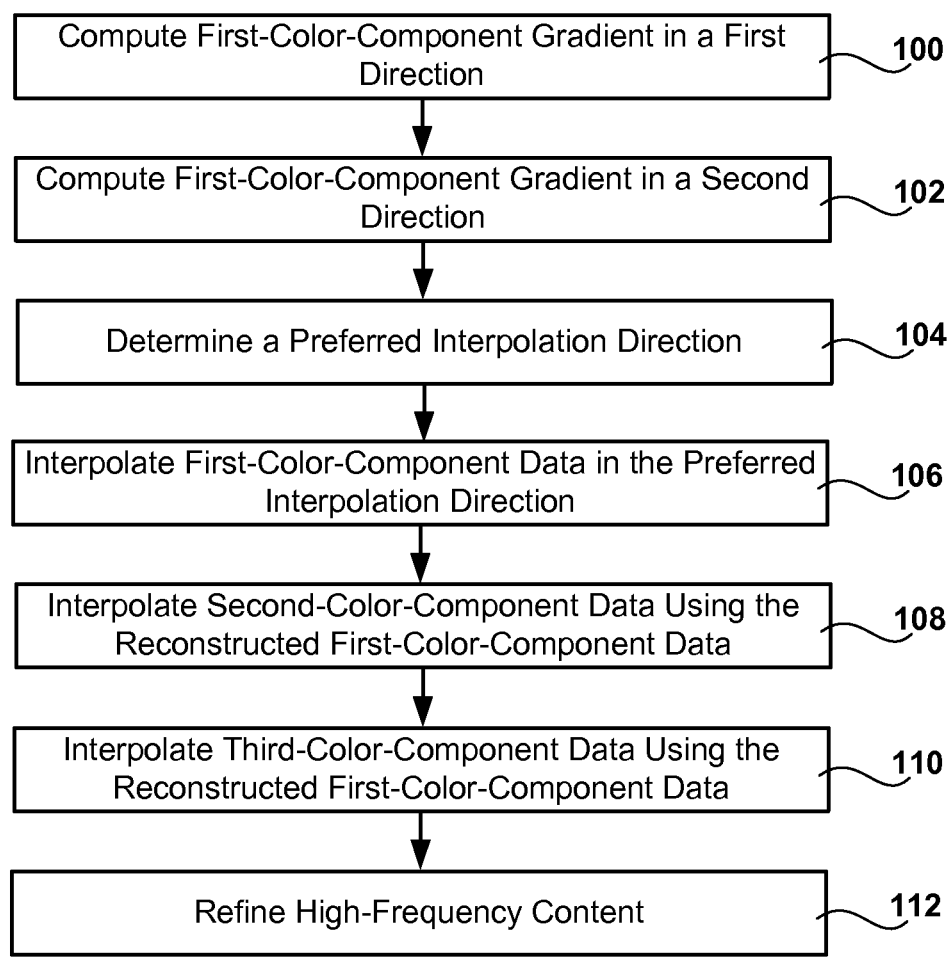
FIG. 10 is a chart showing exemplary embodiments of the present invention comprising high-frequency content refinement.
Figure 11:
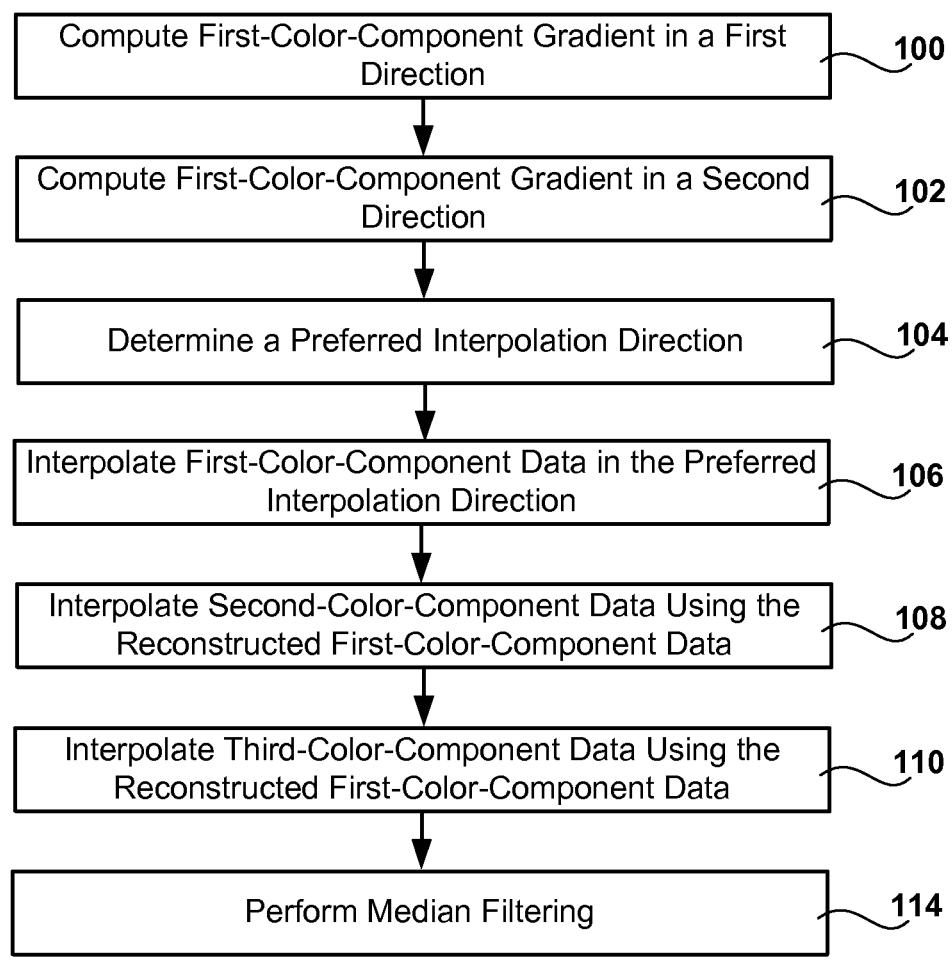
FIG. 11 is a chart showing exemplary embodiments of the present invention comprising median filtering.

Some embodiments of the present invention described in relation to FIG. 10 may comprise high-frequency content refinement 112. Some embodiments of the present invention described in relation to FIG. 11 may comprise median filtering 114. Some embodiments of the present invention described in relation to FIG. 12 may comprise high-frequency content refinement 112 and median filtering 116.

Some embodiments of the present invention may be described in relation to FIG. 13. In these embodiments, data associated with a first color component may be interpolated 120 in multiple directions. In some embodiments, first-color-component data interpolation 120 may comprise filtering of first-color-component data and data associated with a second color component according to:

$$\hat{C}_1^d = h_1^d * C_1 + h_2^d * C_2,$$

where $\hat{C}_1^d$ denotes the first-color-component interpolated data in a direction denoted d, $C_1$ and $C_2$ denote first-color-component data and second-color-component data, respectively, and $h_1^d$ and $h_2^d$ denote filter kernels associated with direction d and the first and second color components, respectively. In some exemplary embodiments of the present invention, the first color component may be associated with green spectral content and the second color component may be associated with red spectral content. In alternative exemplary embodiments of the present invention, the first color component may be associated with green spectral content and the second color component may be associated with blue spectral content.

In alternative embodiments, the first-color-component data interpolation 120 may comprise filtering of first-color-component data, second-color-component data and third-color-component data according to: $\hat{C}_1^d = h_1^d * C_1 + h_2^d * C_2 + h_3^d * C_3$, where $\hat{C}_1^d$ denotes the first-color-component interpolated data in direction d, $C_1$, $C_2$, and $C_3$ denote first-color-component data, second-color-component data and third-color-component data respectively, and $h_1^d$, $h_2^d$ and $h_3^d$ denote filter kernels associated with direction d and the first, second and third color components, respectively. In some embodiments of the present invention, in order to prevent mean color shifts, the second-color-component filter and the third-color-component filter may be jointly designed and may have zero DC response. In some embodiments of the present invention, the first color component may be associated with green spectral content, the second color component may be associated with red spectral content and the third color component may be associated with blue spectral content.

A first-color-component gradient measure may be calculated 122 in each of the multiple directions in which the first-color-component was interpolated 120.

A preferred interpolation direction may be determined 124 based on the gradient measures, and reconstructed data associated with the first color component may be selected 126 based on the preferred interpolation direction. Second-color-component data may be interpolated 128 using the reconstructed first-color-component data, and third-color-component data may be interpolated 130 using the reconstructed first-color-component data. Exemplary interpolation methods comprise bilinear interpolation, linear interpolation, spline interpolation, cubic interpolation, cosine interpolation, Hermite interpolation, polynomial interpolation and other interpolation methods known in the art.

In some embodiments of the present invention, a gradient measure in a direction denoted d, may be determined using color-component differences according to:

$$C_{i,j}^d = C_k(i,j) - \hat{C}_1^d(i,j),$$

where $C_k(i,j)$ denotes one of the second color component and the third color component. In some of these embodiments, a gradient in direction d, may be determined according to:

$$D_{i,j}^d = |C_{i,j}^d - C_{d(i,j)}^d|,$$

where $d(i,j)$ denotes a directional displacement relative to i,j. In alternative embodiments, a directional gradient may be calculated over larger windows according to:

$$D_{i,j}^d = \sum_{J=-K1}^{K1} \sum_{I=-K2}^{K2} g_{I,J}^d C_{i+I,j+J}^d$$

for direction d. The weights $g_{I,J}^d$, may determine which neighboring pixels may contribute to the directional gradient and with what weight they may contribute. In yet alternative embodiments, a directional gradient may be based on three-channel data within a window according to:

$$D_{i,j}^d = \sum_{J=-K1}^{K1} \sum_{I=-K2}^{K2} g_2^d(I,J)C_2(i+I,j+J) +$$
$$g_1^d(I,J)\hat{C}_1^d(i+I,j+J)g_3^d(I,J)C_3(i+I,j+J)$$

where $g_1^d$, $g_2^d$ and $g_3^d$ may determine which neighboring pixels, for each color component, contribute to the gradient and with what weight they may contribute. Where there is no color-component data available, the corresponding weights may be zero.

In some embodiments of the present invention, the preferred interpolation direction may be determined 124 based on direction-classification variables calculated in association with the gradients in each interpolation direction. In some embodiments, for a particular direction, a classification variable value at a location may be the weighted sum of the directional-gradient values in a neighborhood proximate to the location according to:

$$\delta_{i,j}^d = \sum_{J=-K1}^{K1} \sum_{I=-K2}^{K2} w_{I,J}^d D_{i+I,j+J}^d,$$

where $w_{I,J}^d$, may determine which neighboring gradients contribute to the direction-classification variable denoted $\delta_{i,j}^d$, and with what weight they may contribute.

In some embodiments of the present invention, the preferred interpolation direction at a location i,j may be orthogonal to the direction associated with $$\max_d(\delta_{i,j}^d).$$

In alternative embodiments, when $$\max_d(\delta_{i,j}^d) \le T_\delta$$

for a threshold $T_\delta$, the preferred interpolation direction may be a pre-determined direction. In other alternative embodiments, the preferred interpolation direction may be based on other criteria associated with the direction-classification variables.

In some embodiments of the present invention, the second-color-component values and third-color-component values may be interpolated in the preferred interpolation direction using the reconstructed first-color-component values interpolated in the preferred interpolation direction. In alternative embodiments, the second-color-component values and third-color-component values may be interpolated in a direction, or directions, not related to the preferred interpolation direction.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for demosaicing an image, said method comprising:

wherein said image comprises a first plurality of pixel locations where at each pixel location, in said first plurality of pixel locations, a first-color-component value and a second-color-component value are known;

wherein said image comprises a second plurality of pixel locations where at each pixel location, in said second plurality of pixel locations, a third-color-component value is known;

wherein no pixel location in said first plurality of pixel locations is in said second plurality of pixel locations;

interpolating, in a first direction, third-color-component values at said first plurality of pixel locations, thereby producing first-direction-interpolated third-color-component values, wherein said interpolating in said first direction comprises a weighted average of a first plurality of third-color-component values and one of a first plurality of first-color-component values and a first plurality of second-color-component values, wherein said one of a first plurality of first-color-component values and a first plurality of second-color-component values is selected based on a first correlation between said first color component and said third color component and a second correlation between said second color component and said third color component;

interpolating, in a second direction, third-color-component values at said first plurality of pixel locations, thereby producing second-direction-interpolated third-color-component values;

interpolating first-color-component values at said second plurality of pixel locations using said first-direction-interpolated third-color-component values when a first criterion comprising a first gradient-strength measure associated with said first direction and a second gradient-strength measure associated with said second direction is met; and interpolating first-color-component values at said second plurality of pixel locations using said second-direction-interpolated third-color-component values when a second criterion comprising said first gradient-strength measure associated with said first direction and said second gradient-strength measure associated with said second direction is met.

2. A method as described in claim 1 further comprising interpolating first-color-component values at said second plurality of pixel locations using said first-direction-interpolated third-color-component values and said second-direction-interpolated third-color-component values when said first gradient-strength measure associated with said first direction meets a third criterion in relation to said second gradient-strength measure associated with said second direction.

3. A method as described in claim 1, wherein:

said second plurality of pixels is associated only with said third color component;

said first color component is associated with blue spectral content;

said second color component is associated with red spectral content; and
said third color component is associated with green spectral content.

4. A method as described in claim 1 further comprising median filtering.

5. A method as described in claim 1 further comprising, for a first interpolated first-color-component pixel in said second plurality of pixels:
determining a high-frequency portion of a third-color-component value associated with said first interpolated first-color-component pixel;
determining a low-frequency portion of a first interpolated first-color-component value associated with said first interpolated first-color-component pixel; and
adjusting the first-color-component value of said first interpolated first-color-component pixel to the sum of said high-frequency portion and said low-frequency portion.

6. A method as described in claim 1 further comprising refining a high-frequency portion of one of said first-color-component values, said second-color-component values and said third-color-component values based on another of said first-color-component values, said second-color-component values and said third-color-component values.

7. A method as described in claim 1 further comprising:
interpolating second-color-component values at said second plurality of pixel locations using said first-direction-interpolated third-color-component values when said first gradient-strength measure associated with said first direction meets said first criterion in relation to said second gradient-strength measure associated with said second direction; and
interpolating second-color-component values at said second plurality of pixel locations using said second-direction-interpolated third-color-component values when said first gradient-strength measure associated with said first direction meets said second criterion in relation to said second gradient-strength measure associated with said second direction.

8. A method as described in claim 7 further comprising interpolating second-color-component values at said second plurality of pixel locations using said first-direction-interpolated third-color-component values and said second-direction-interpolated third-color-component values when said first gradient-strength measure associated with said first direction meets a third criterion in relation to said second gradient-strength measure associated with said second direction.

9. A method as described in claim 1, wherein:
said interpolating first-color-component values at said second plurality of pixel locations using said first-direction-interpolated third-color-component values comprises interpolation in said first direction; and
said interpolating first-color-component values at said second plurality of pixel locations using said second-direction-interpolated third-color-component values comprises interpolation in said second direction.

10. A method for demosaicing an image, said method comprising:
wherein said image comprises a first plurality of pixel locations where at each pixel location, in said first plurality of pixel locations, a first-color-component value and a second-color-component value are known;
wherein said image comprises a second plurality of pixel locations where at each pixel location, in said second plurality of pixel locations, a third-color-component value is known;
wherein no pixel location in said first plurality of pixel locations is in said second plurality of pixel locations;
calculating, in a first direction, a first gradient associated with a third color component, wherein said calculating, in a first direction, a first gradient associated with said third color component comprises a weighted average of one of a first plurality of first-color-component values and a first plurality of second-color-component values, wherein said one of a first plurality of first-color-component values and a first plurality of second-color-component values is selected based on a first correlation between said first color component and said third color component and a second correlation between said second color component and said third color component;
calculating, in a second direction, a second gradient associated with said third color component;
determining a gradient measure using said first gradient and said second gradient;
interpolating, in an interpolation direction determined by said gradient measure, third-color-component values at said first plurality of pixel locations, thereby producing interpolated third-color-component values; and
interpolating first-color-component values at said second plurality of pixel locations using said interpolated third-color-component values.

11. A method as described in claim 10 further comprising interpolating, in said first direction and said second direction, third-color-component values at said second plurality of pixel locations when said gradient measure meets a first criterion.

12. A method as described in claim 10, wherein:
said second plurality of pixels is associated only with said third color component;
said first color component is associated with blue spectral content;
said second color component is associated with red spectral content; and
said third color component is associated with green spectral content.

13. A method as described in claim 10 further comprising median filtering.

14. A method as described in claim 10 further comprising, for a first interpolated first-color-component pixel in said second plurality of pixels:
determining a high-frequency portion of a third-color-component value associated with said first interpolated first-color-component pixel;
determining a low-frequency portion of a first interpolated first-color-component value associated with said first interpolated first-color-component pixel; and
adjusting the first-color-component value of said first interpolated first-color-component pixel to the sum of said high-frequency portion and said low-frequency portion.

15. A method as described in claim 10 further comprising refining a high-frequency portion of one of said first-color-component values, said second-color-component values and said third-color-component values based on another of said first-color-component values, said second-color-component values and said third-color-component values.

16. A method as described in claim 10 further comprising interpolating second-color-component values at said second plurality of pixel locations using said interpolated third-color-component values.

17. A method as described in claim 16, wherein said interpolating second-color-component values at said second plurality of pixel locations using said interpolated third-color-component values comprises interpolating in said interpolation direction determined by said gradient measure.

18. A method as described in claim 10, wherein said interpolating first-color-component values at said second plurality of pixel locations using said interpolated third-color-component values comprises interpolating in said interpolation direction determined by said gradient measure.

19. A method for demosaicing an, said method comprising:
wherein said image comprises a first plurality of pixel locations where at each pixel location, in said first plurality of pixel locations, a first-color-component value and a second-color-component value are known;
wherein said image comprises a second plurality of pixel locations where at each pixel location, in said second plurality of pixel locations, a third-color-component value is known;
wherein no pixel location in said first plurality of pixel locations is in said second plurality of pixel locations;
interpolating, in a first direction, third-color-component values at said first plurality of pixel locations, thereby producing first-direction-interpolated third-color-component values;
interpolating, in a second direction, third-color-component values at said first plurality of pixel locations, thereby producing second-direction-interpolated third-color-component values;
calculating a first gradient measure in said first direction using said first-direction-interpolated third-color-component values;
calculating a second gradient measure in said second direction using said second-direction-interpolated third-color-component values;
determining a preferred interpolation direction using said first gradient measure and said second gradient measure;
interpolating first-color-component values at said second plurality of pixel locations using interpolated third-color-component values associated with said preferred interpolation direction;
interpolating, in a third direction, third-color-component values at said first plurality of pixel locations, thereby producing third-direction-interpolated third-color-component values;
calculating a third gradient measure in said third direction using said third-direction-interpolated third-color-component values; and
wherein said determining a preferred interpolation direction using said first gradient measure and said second gradient measure further comprises using said third gradient measure.

* * * * *